(12) United States Patent
Mavrogiannopoulos et al.

(10) Patent No.: US 11,102,191 B2
(45) Date of Patent: *Aug. 24, 2021

(54) ENABLING SINGLE SIGN-ON AUTHENTICATION FOR ACCESSING PROTECTED NETWORK SERVICES

(71) Applicant: Red Hat, Inc., Raleigh, NC (US)

(72) Inventors: Nikolaos Mavrogiannopoulos, Brno (CZ); Nathaniel McCallum, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,435

(22) Filed: Oct. 1, 2019

(65) Prior Publication Data

US 2020/0036700 A1   Jan. 30, 2020

Related U.S. Application Data

(63) Continuation of application No. 14/933,438, filed on Nov. 5, 2015, now Pat. No. 10,454,917.

(51) Int. Cl.
*H04L 29/06* (2006.01)
(52) U.S. Cl.
CPC ...... *H04L 63/0815* (2013.01); *H04L 63/0272* (2013.01)
(58) Field of Classification Search
CPC .................. H04L 63/0815; H04L 63/0272
See application file for complete search history.

(56) References Cited

U.S. PATENT DOCUMENTS 7,181,620 B1 * 2/2007 Hur .................. H04L 9/083
                                                    713/168
8,683,562 B2   3/2014 Ting et al.
(Continued)

FOREIGN PATENT DOCUMENTS

CN    101404643 A    4/2009
WO    2012098265 A1   7/2012

OTHER PUBLICATIONS

Tulloch, Mitch, "VPN Single Sign on With Windows 7", WindowsNetworking.com, Jun. 7, 2011, 8 pages.
(Continued)

*Primary Examiner* — Alexander Lagor
*Assistant Examiner* — Vu V Tran
(74) *Attorney, Agent, or Firm* — Lowenstein Sandler LLP

(57) ABSTRACT

Embodiments of the disclosure enable single sign-on for secure network services. In one embodiment, a method is provided. The method comprises providing, by a processing device of a first server, a prompt for first login information associated a second server. An authentication request is transmitted on behalf of a client to the second server to authenticate the first login information received from the client. An authentication ticket is provided to the client in view of the first login information. The authentication ticket is received from the second server in response to authentication of the first login information. A service request comprising the authentication ticket and a request to access a service associated with the first server is received from the client. Thereupon, access to the service by the client is enabled by applying the authentication ticket, without prompting the client for entry of second login information.

14 Claims, 5 Drawing Sheets

(56) References Cited

U.S. PATENT DOCUMENTS

| | | |
|---|---|---|
| 8,738,897 B2 | 5/2014 | Mukkara |
| 9,032,496 B2 | 5/2015 | Mocanu |
| 9,037,851 B2 | 5/2015 | Choi |
| 2003/0188193 A1* | 10/2003 | Venkataramappa ........................ H04L 63/0807 726/10 |
| 2004/0003287 A1 | 1/2004 | Zissimopoulos et al. |
| 2009/0222662 A1* | 9/2009 | Hataoka ................ G06Q 20/341 713/169 |
| 2011/0213966 A1* | 9/2011 | Fu .......................... H04L 9/3268 713/158 |
| 2013/0024688 A1 | 1/2013 | Wen et al. |
| 2013/0227677 A1* | 8/2013 | Pal ......................... H04L 9/3228 726/19 |
| 2014/0068702 A1 | 3/2014 | Hyndman et al. |
| 2014/0331297 A1* | 11/2014 | Innes .................. H04L 63/0281 726/7 |
| 2015/0089621 A1* | 3/2015 | Khalid ................ H04L 63/0807 726/9 |
| 2016/0261581 A1 | 9/2016 | Wang et al. |
| 2017/0034168 A1* | 2/2017 | Wilson ................ H04L 63/0281 |

OTHER PUBLICATIONS

McKillip, Doug, "VPN Single Sign on and the New Global Knowledge ASA Essentials Class", Global Knowledge Training Blog, Mar. 3, 2011, 1 page.

Mavrogiannopoulos, Nikos, "Single Sign-On With OpenConnect VPN Server Over FreeIPA", Jun. 17, 2015, 3 pages.

USPTO, Office Action for U.S. Appl. No. 14/933,438, dated Mar. 8, 2017.

USPTO, Final Office Action for U.S. Appl. No. 14/933,438, dated Jul. 5, 2017.

USPTO, Office Action for U.S. Appl. No. 14/933,438, dated Oct. 31, 2017.

USPTO, Final Office Action for U.S. Appl. No. 14/933,438, dated May 1, 2018.

USPTO, Office Action for U.S. Appl. No. 14/933,438, dated Jan. 10, 2019.

USPTO, Advisory Action for U.S. Appl. No. 14/933,438, dated Sep. 22, 2017.

USPTO, Notice of Allowance for U.S. Appl. No. 14/933,438, dated Jun. 11, 2019.

* cited by examiner

ENABLING SINGLE SIGN-ON AUTHENTICATION FOR ACCESSING PROTECTED NETWORK SERVICES

RELATED APPLICATIONS

This application is a continuation of U.S. patent application Ser. No. 14/933,438 filed on Nov. 5, 2015, the entire content of which is incorporated by reference herein.

TECHNICAL FIELD

The present disclosure is generally related to network security, and more specifically, but without limitation, to enabling single sign-on authentication for accessing protected network services.

BACKGROUND

Some servers may be utilized to extend a protected network across an unsecure public network, such as the Internet. These servers may allow users to access services via the unsecure public networks as if their computing devices were directly connected to the protected network. Typically, to request access to a service from these types of servers, a client must be "authenticated" prior to receiving the requested service. This is often done using an authentication server.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

The present disclosure is illustrated by way of examples, and not by way of limitation, and may be more fully understood with references to the following detailed description when considered in connection with the figures, in which.

DETAILED DESCRIPTION

Figure 1:
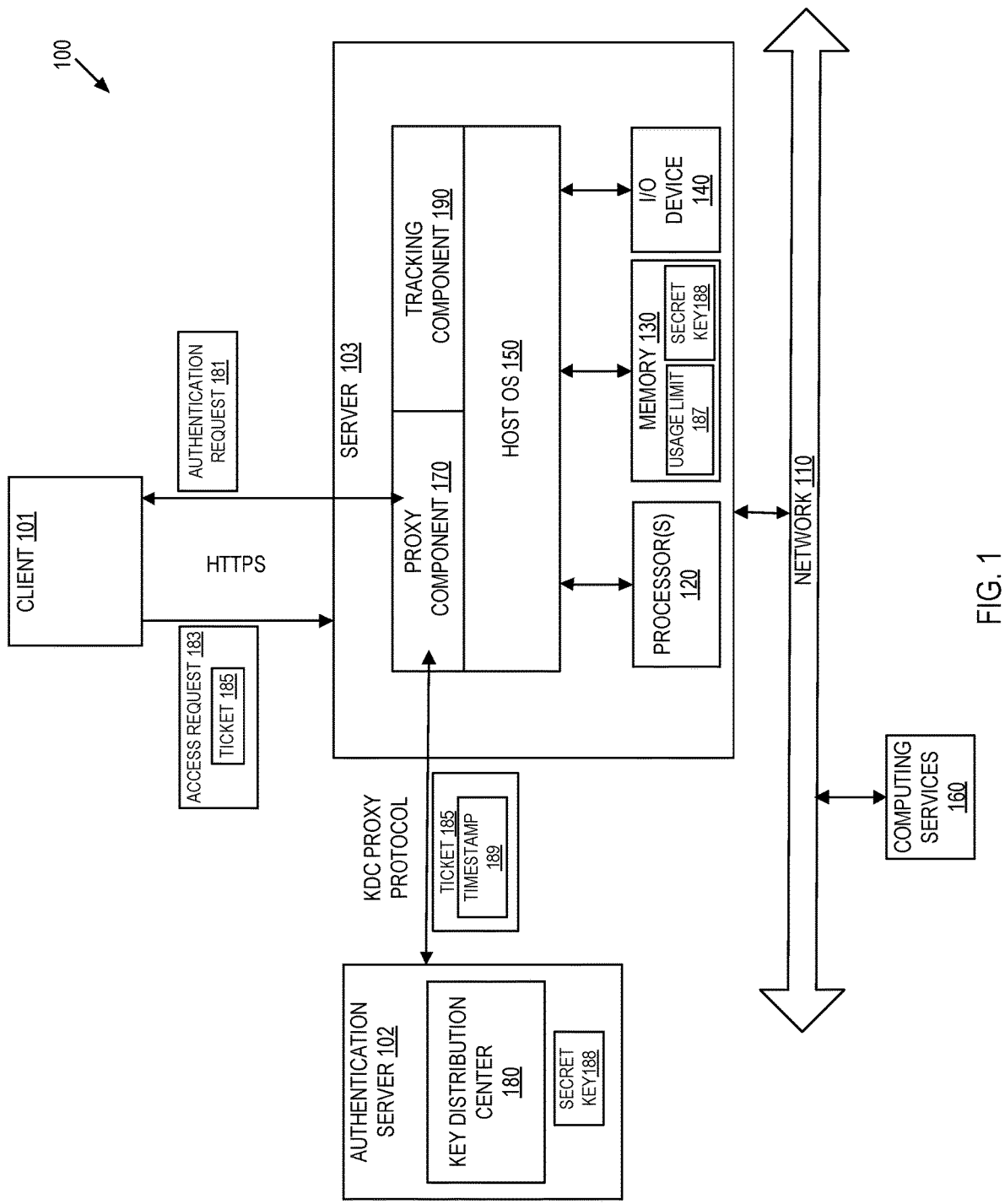
FIG. 1 depicts a high-level component diagram of an example computer system in accordance with one or more aspects of the present disclosure.

Described herein are techniques for enabling single sign-on authentication for accessing protected network services, e.g., applications and/or data residing on password protected networks, such as a "Virtual Private Network" (VPN). The term "authentication" is used to refer to any system, device, application, service, or other process that may perform operations in response to receiving a request from a client device to access services associated with a network, such as a VPN. For example, these operations may include validating whether the client device is the device that it purports to be and that it is authorized to access the VPN.

VPN herein shall refer to techniques for establishing protected communication sessions between a remote client device or system and a core network (e.g., an enterprise network), and/or providing access to such protected communication sessions. A client program (referred to as a VPN client) running on a user's computer system (e.g., a laptop computer, a desktop computer, or other computing device) may establish one or more encrypted communication sessions with a VPN server, and thus allow the user to securely access computing resources which reside on a protected network (such as an enterprise network).

To connect to a VPN server, a client device typically launches a VPN client to sign onto the VPN server using certain login credentials associated with the VPN network/server. Once both computers have verified each other as authentic, all of the communications between the computers are encrypted and secured from eavesdropping. In many cases, the VPN client may use a first set of login credentials that includes a username-password pair for signing into the VPN server. Thereafter, the VPN client separately signs into an authentication server using a second set of login credentials associated with the authentication server. As such, there may be two independent secure authentication techniques utilized one after another to access the VPN. Such dual authentication techniques require additional time and effort to sign onto the network without increasing a security level of the network, particularly when the same password pair is used for both logins.

In accordance with embodiments of the present disclosure, techniques are provided that combines the two independent authentications as described above to achieve a single sign-on authentication process to access protected network services. These techniques allow a client device to sign-on to an authentication server (e.g., a Kerberos server) once to obtain an authentication ticket that can also be used to sign-on to a VPN. In some embodiments, the VPN server may be modified so that it operates as a communication proxy to the authentication server as well as an authentication-enabled service. In one embodiment, a secure communication protocol associated with the VPN server, such as Hypertext Transfer Protocol over Secure Sockets Layer (HTTPS), in combination with a secure communication protocol of the authentication server may be utilized to ensure that all transactions are protected to ensure the privacy of any exchange.

In an illustrative example, the client device may be prompted by a VPN server to supply a first set of login credentials (e.g., a user name, a password) for an authentication server. The VPN server may then transmit an authentication request on behalf of the client to the authentication server based on the user's input. Once the authentication credentials are authenticated by the authentication server, an authentication ticket (e.g., a Kerberos ticket) is provided to the client device for use to access the VPN server and/or other corporate network services. In subsequent access request to obtain access to the VPN server, the client device presents the authentication ticket to the VPN server rather than a second set of login credentials (e.g., a user name, a password). In this way, the login process for the client device to access the protected network is simplified, thereby reducing time consuming login steps, without sacrificing or compromising network security.

Various aspects of the above referenced techniques are described in details herein below by way of examples, rather than by way of limitation.

FIG. 1 illustrates a high-level component diagram of an illustrative example of a computer system 100 that may be used to enable single sign-on for secure authentication services in accordance with one or more aspects of the present disclosure. "Computer system" herein shall refer to a system comprising one or more computing devices, one or more memory devices, and one or more communication interfaces. As shown, the computer system 100 may include a client computer (e.g., client 101), an authentication server 102, and a server computing device (referred to later in this disclosure as "server 103 and "VPN server 103") coupled to a network 110 and include one or more processors (e.g., processors 120) communicatively coupled to memory (e.g., memory 130) and one or more input/output (I/O) devices (e.g., I/O devices 140).

"Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

A processor may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Although, for simplicity, a single processor 120 is depicted in FIG. 1, in some other embodiments the computing devices of computer system 100 may comprise a plurality of processors. Similarly, in some other embodiments the computing devices of computer system 100 may comprise a plurality of I/O devices, rather than a single I/O device 140.

The server computing device 103 may be a server, a mainframe, a workstation, a personal computer (PC), a mobile phone, a palm-sized computing device, etc. The network 110 may be a private network (e.g., a local area network (LAN), a wide area network (WAN), intranet, etc.) or a public network (e.g., the Internet). Server computing device 103 may run "host" software, such host operating system 150 to manage the hardware and other types of system resources that may include processors 120, memory 130, I/O device 140 to provide functions such as inter-process communication, scheduling, memory and data management, and so forth.

As illustrated in FIG. 1, system 100 may comprise a client computer 101 accessing, via server 103, computing services 160 residing on network 110. In other embodiments of the present disclosure, all or part of the computing services 160 may reside on the VPN server 103. These computing services 160 may include physical servers and/or virtual machines, raw and file-based storage, routers, firewalls, and/or load balancers interconnected by two or more LANs and other type of computing services or resources.

In some embodiments, the client computer 101 may access the server 103 over one or more unsecure public networks (e.g., Internet). In that regard, the server 103 also acts as a VPN server to establish, over the public networks, VPN connections with a plurality of VPN clients. In one embodiment, VPN server 103 provides a gateway for accessing the computing services 160. In an illustrative example, client computer 101 may execute a VPN client and provide VPN server login credentials to establish one or more encrypted communication sessions with VPN server 103, which in turn allows the VPN client to securely access the computing services 160 associated with the VPN server 103.

In some embodiments, the computer system 100 supports authentication services to authenticate the VPN client's access to the computing services 160. For example, as shown in FIG. 1, the computer system 100 may further comprise authentication server 102. Although the authentication server 102 is shown running on a dedicated hardware server, in other implementations, authentication server 102 may be co-located with other functional components of computer system 100 that may also be geographically disbursed.

In some implementations, the authentication server 102 implements Kerberos authentication protocols that are designed to allow computer systems communicating over a non-secure network to prove their identity to each other in a secure manner. Kerberos protocol messages are protected against eavesdropping and "replay attacks" where, for example, an attacker causes an operation to be repeated to gain unauthorized access to protected data.

In certain implementations, the authentication server 102 performs the functionality of a Kerberos Key Distribution Center (KDC) 180. In one embodiment, the KDC 180 may issue a Ticket Granting Ticket (TGT) (also referred to as a Kerberos ticket 185) that may be used to gain access to the computing services 160 residing on network 110. In one illustrative example, the KDC 180 may receive a login user name and password associated with authentication server 102 along with a request to access a certain services of the computing services 160. If the user name and password are authentic (e.g., correct), the KDC 180 responds with a Kerberos ticket 185 that can be used to access the requested services.

Embodiments of the present disclosure combines two independent sign on steps of the client 101, first to the VPN server 103 and then again to the authentication server 102, to achieve a single sign-on authentication process. In an illustrative example, client 101 may transmit, to VPN server 103, an authentication request 181 that includes a user name and password for authentication server 102 rather than login credentials for the VPN server 103. The VPN server 103 may then transmit the authentication request 181, via an HTTP proxy component 170, to authentication server 102 on behalf of the client 101. In some embodiments, the authentication server 102 responds by providing the VPN server 103 with a Kerberos ticket 185 to transmit back to the client 101, which the client 101 may store for future use.

Since the VPN server 103 establishes secure HTTPS connections via the proxy component 170, the client-server message exchanges described herein may be performed over a public network. In this regard, the proxy component 170 of VPN server 103 operates as an intermediary between the client 101 and the authentication server 102. In some embodiments, the proxy component 170 includes hardware and software components for receiving/sending messages and data, such as Kerberos ticket 185. Although the proxy component 170 may be shown integrated with VPN server 103, it may also be on dedicated hardware or server separate from the VPN server 103. The proxy component 170 may be configured to securely communicate with the authentication server 102 using a certain proxy protocol, such as Kerberos Key Distribution Center Proxy Protocol (KKDCP). KKDCP may be used by an HTTP-based server, such as VPN server 103, to relay secure message to a Kerberos authentication server. In some embodiments, one or more proxy configuration files located at the VPN server 103 may be updated to enable the KKDCP proxy communications. These configuration file changes may allow the VPN server 103 to obtain a Kerberos ticket 185 from the authentication server 102 on behalf of the client 101.

In some embodiment, the Kerberos ticket 185 is encrypted by using a secret key that is shared between the authentication server 102 and the VPN server 103. For example, the authentication server 102 may generate a secret key for each of the entities on network 110. Each secret key is only known to the network entity and the authentication server 102 to ensure the identity of the network entity. In one embodiment, the authentication server 102 generates the Kerberos ticket 185 and encrypts it with a shared secret 188 key known to both it and the VPN server 103 before the Kerberos ticket 185 is returned to the client 101. Another advantage of encrypting the Kerberos ticket 185 with the shared secret 188 key is that it provides an extra level of security because the client 101 cannot inspect or modify contents inside of the encrypted Kerberos ticket 185.

In a subsequent access request 183 from the client 101 to access the computing services 160, the client 101 provides the Kerberos ticket 185 to the VPN server 103 instead of executing a login process to the VPN server 103. In response to receipt of this access request 183 comprising the Kerberos ticket 185, VPN server 103 decrypts the Kerberos ticket 185 using the shared secret key 188. Successfully decryption of the Kerberos ticket 185 using the secret key 188 proves that the client 101 is authenticated to the authentication server 102. The VPN server 103 trust what is inside of the encryption of the Kerberos ticket 185, and thus, there is no need for the VPN server 103 to again contact the authentication server 102. Once the Kerberos ticket 185 is authenticated, the VPN server 103 allows access by the client 101 as requested.

In some cases, after a client computer (e.g., client 101) stores the Kerberos ticket 185, it may be stolen or lost. In such cases, to prevent unauthorized re-authentication of the client computer using the Kerberos ticket 185, a usage limit 187 on authentication tickets may be enforced by the VPN server 103. In some embodiments, the usage limit 187 may be stored by the VPN server 103, for example, in memory 130. In one embodiment, the usage limit 187 may be a configurable value indicating an amount of time an authentication ticket can be accepted from a time it is generated by the authentication server 102. In this way, VPN server authentication occurs only upon determining that the authentication ticket is sufficiently "fresh."

Typically, the Kerberos ticket 185 may include a timestamp 189 indicating a time that the ticket 185 was generated by the authentication server 102. Upon receiving the Kerberos ticket 185, the VPN server 103 checks whether an amount of time between ticket's timestamp 189 and a current time meets the usage limit 187. If the amount of time since the Kerberos ticket 185 was generated meets the usage limit 187, the client 101 may be requested to re-input authentication credentials. For example, the VPN server 103 may provide a prompt for the client 101 to re-input login information for signing onto the authentication server 103. The VPN server 103 may then send the re-inputted the login information on behalf of client 101 to the authentication server 103 to authenticate.

Since the VPN server 103 is operating as a proxy for Kerberos messages, the authentication server 102 may not be able to identify the real network address of a client. Because of this, in some embodiments, the VPN server 103 may include a tracking component 190 to track a number of authentication requests received from a particular network address. In other embodiments, the tracking component 190 may reside on dedicated hardware separate from the VPN server 103. In one embodiment, the tracking component 190 may be operable in conjunction with computer system 100 from where it may receive the above described authentication request. In other embodiment, this component 190 can exist in a fewer or greater number of modules than shown in FIG. 1, with such modules residing on one or more computing devices, which may be geographically dispersed.

When the VPN server 103 receives an authentication request on behalf of a client, such as client 101, the tracking component 190 identifies a network address for this client. In some embodiments, the tracking component 190 may then store this network address, for example, in memory 130, a table, file, database or other types of components for storing data with a counter that is incremented each time a request is received from that address. When the counter for a particular address meets a determined threshold amount, the VPN server 103 may deny a subsequent authentication request from that network address. An advantage of using the tracking component 190 is that it may help the computer system 100 to protect the VPN server 103 from a flood of authentication requests which can cause a denial of service.

Figure 2:
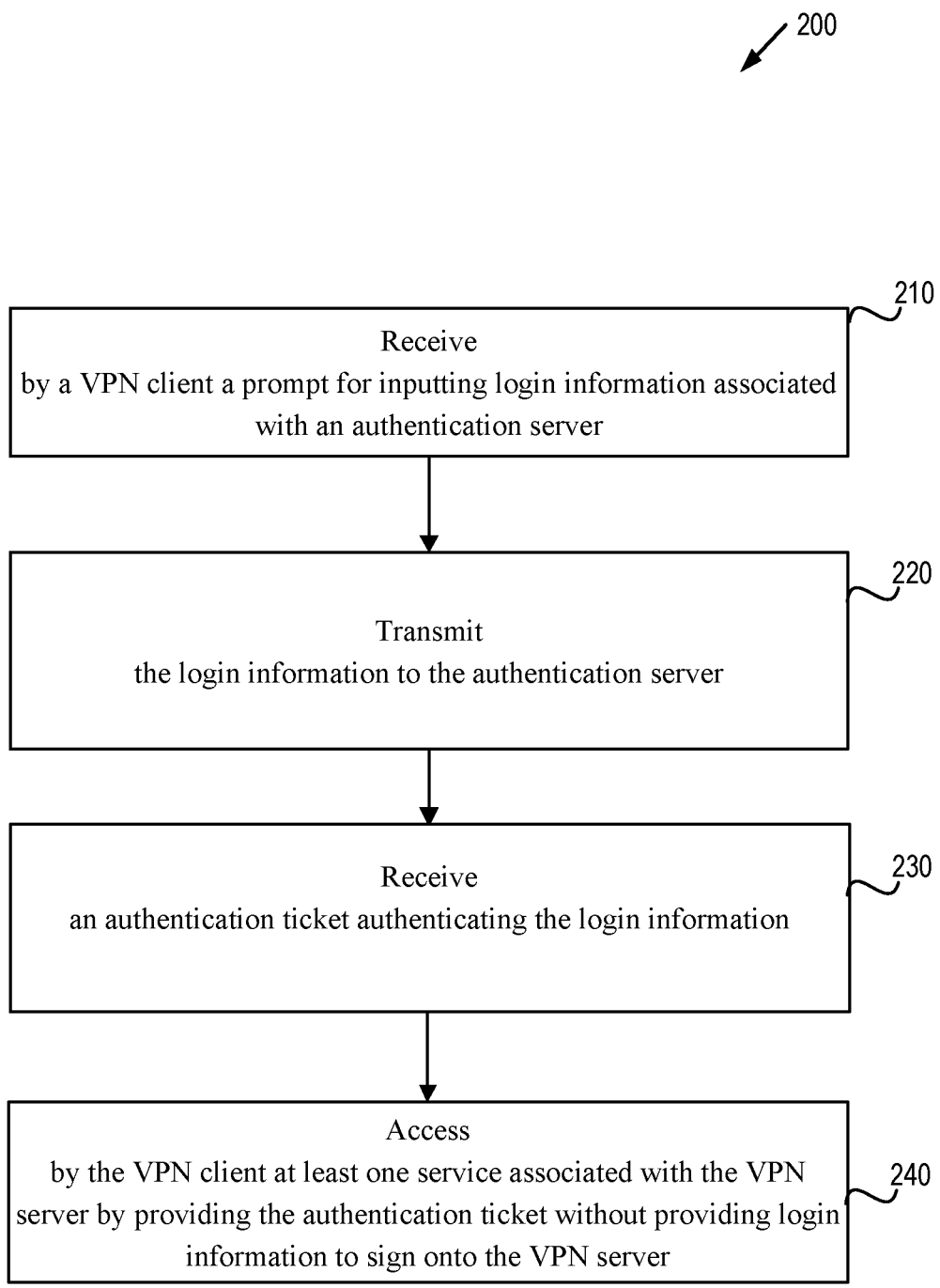
FIG. 2 depicts a flow diagram of a method to enable single sign-on authentication for client computer in accordance with one or more aspects of the present disclosure.

FIG. 2 depicts a flow diagram of a method 200 to enable single sign-on authentication for a client computer, such as client 101, in accordance with one or more aspects of the present disclosure. In an embodiment, components of the computer system 100 of FIG. 1 may perform method 200. For instance, the method 200 may be performed by processing logic associated with computer system 100 that may comprise hardware (circuitry, dedicated logic, etc.), software (e.g., software executed by a general purpose computer system or a dedicated machine), or a combination of both. In alternative embodiments, some or all of the method 200 may be performed by other components of computer system 100, such as processors 120. It should be noted that blocks depicted in FIG. 2 can be performed simultaneously or in a different order than that depicted.

Method 200 begins at block 210 where a prompt for inputting login information associated an authentication server is received. For example, a VPN client, such as client 101, may execute a client program to establish a communication session with VPN server 103 in which the VPN server 103 provides a prompt for inputting login information associated authentication server 102. In block 220, the login information is transmitted to an authentication server, such as authentication server 102.

In response to the request, an authentication ticket, such as Kerberos ticket 185, is received at block 230. In some embodiments, the authentication ticket is generated by the authentication server 102 in response to authenticating the login information. Subsequently, at least one service associated with the VPN server 103 is accessed in block 240 by the VPN client by providing the authentication ticket, without providing login information to sign on to the VPN server 103. For example, client 101 may transmit the Kerberos ticket 185 to VPN server 103 which in turn may decrypt the ticket using a secret key to authenticate the client's access to protected network services.

Figure 3:
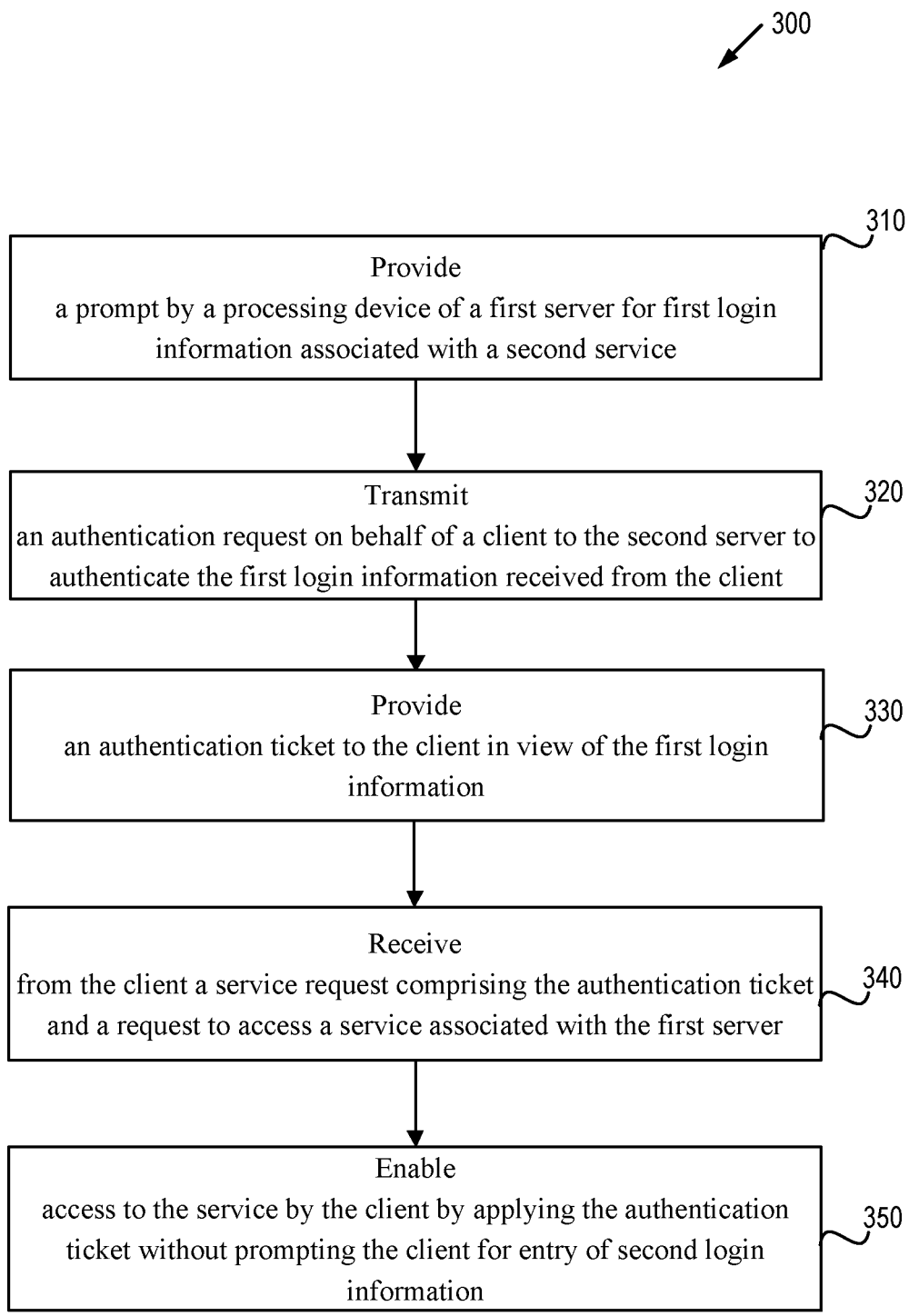
FIG. 3 depicts a flow diagram of a method to enable single sign-on authentication for accessing protected network services in accordance with one or more aspects of the present disclosure.

FIG. 3 depicts a flow diagram of an embodiment of a method 300 to enable single sign-on authentication for accessing protected network services in accordance with one or more aspects of the present disclosure. In an embodiment, components of the computer system 100 of FIG. 1 may perform method 300. For instance, the method 300 may be performed by processing logic associated with computer system 100 that may comprise hardware (circuitry, dedicated logic, etc.), software (e.g., software executed by a general purpose computer system or a dedicated machine), or a combination of both. In alternative embodiments, some or all of the method 300 may be performed by other components of computer system 100, such as processors 120. It should be noted that blocks depicted in FIG. 3 can be performed simultaneously or in a different order than that depicted.

Method 300 begins at block 310 where a prompt for first login information associated with an authentication server is provided by a processing device of a first server (e.g., VPN server 103). For example, VPN server 103 may execute a command using processor 120 that provides a prompt to client 101 for inputting login information for authentication server 102. In block 320, an authentication request is transmitted on behalf of a client to a second server (e.g. authentication server 102) to authenticate the first login information received from the client. For example, VPN server 103 may be configured to act as a proxy for the authentication server 102 to transmit authentication messages on behalf of client 101. An authentication ticket (e.g., Kerberos ticket 185) is provided to the client (e.g., client 101) in block 330 in view of the first login information. For example, VPN server 103 receives from the second server (e.g., authentication server 102) based on the first login information being authenticated.

Thereafter, a service request comprising the authentication ticket is received from the client in block 340. For example, client 101 may transmit Kerberos ticket 185 to VPN server 103 in order to gain access to one or more services in which the server 103 provides gateway access. In block 350, access to the service is enabled for the client by applying the authentication ticket, without prompting the client for entry of second login information. For example, VPN server 103 may authentication the ticket by decrypting the ticket using a secret key known to it and the authentication server 102 to allow access by the client 101 as requested.

Figure 4:
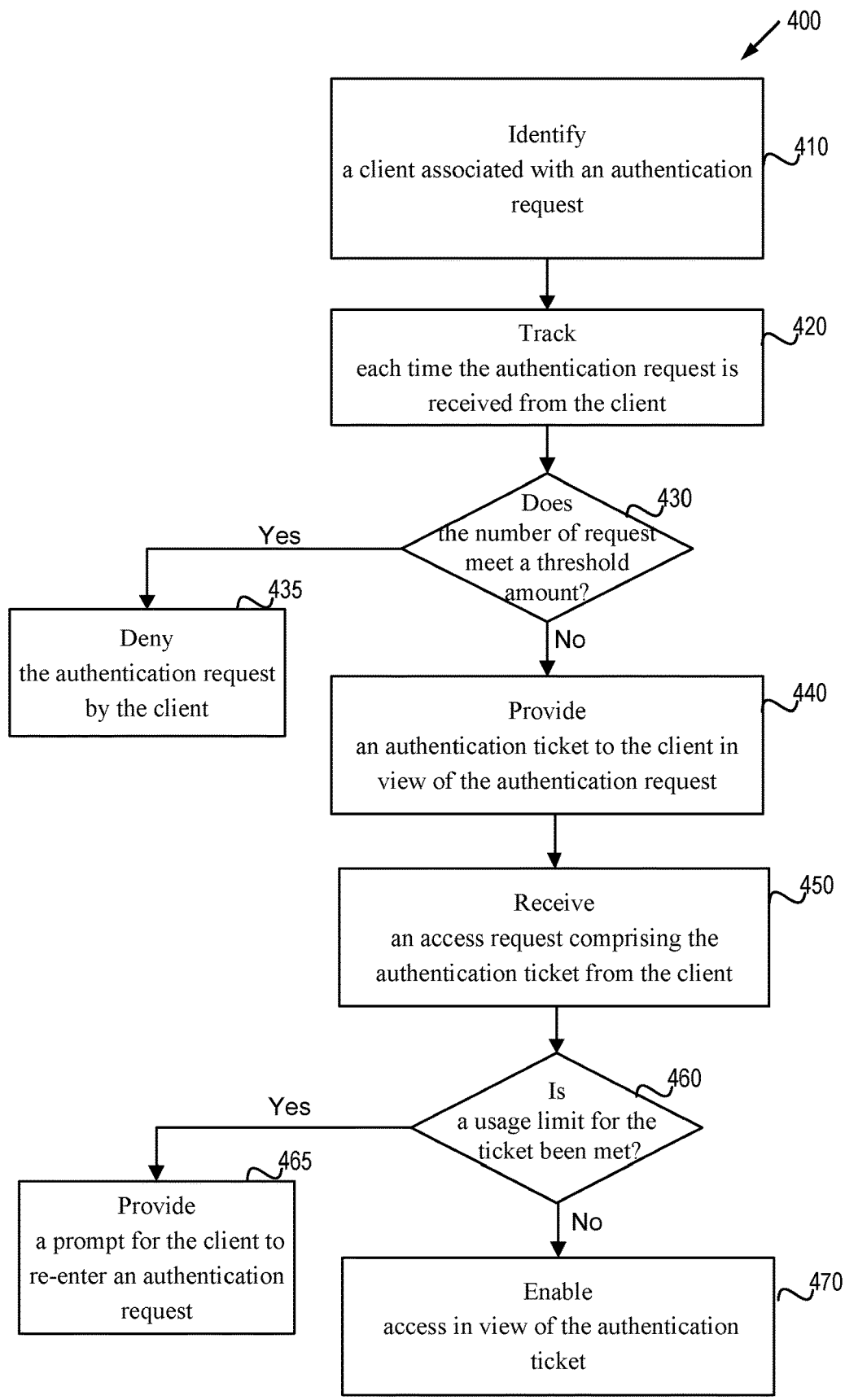
FIG. 4 depicts a flow diagram of a method to prevent unauthorized activities in single sign-on authentication for accessing protected network services in accordance with one or more aspects of the present disclosure.

FIG. 4 depicts a flow diagram of a method to prevent unauthorized activities in single sign-on authentication for accessing protected network services in accordance with one or more aspects of the present disclosure. In one embodiment, components of the computer system 100 of FIG. 1 may perform method 400. For instance, the method 400 may be performed by processing logic associated with computer system 100 that may comprise hardware (circuitry, dedicated logic, etc.), software (e.g., software executed by a general purpose computer system or a dedicated machine), or a combination of both. In alternative embodiments, some or all of the method 400 may be performed by other components of computer system 100, such as processors 120. It should be noted that blocks depicted in FIG. 4 can be performed simultaneously or in a different order than that depicted.

Method 400 begins at block 410 where a client associated with an authentication request is identified. For example, VPN server 103 may identify a network address for a client, such as client 101, for which an authentication request is to be transmitted. In block 420, each authentication request received from the client is tracked. For example, VPN server 103 may keep a count of the number time that a particular network address has transmitted an authentication request.

Method 400 branches at block 430 depending on whether the number of authentication request received from the client meets a threshold amount. If it is determined that the threshold amount is met, method 400 may process to block 435. Otherwise, method 400 proceeds to block 440. In block 435, the authentication request by the client is deny. In block 440, an authentication ticket (e.g., Kerberos ticket 185) received from the authentication server 102 is provided to the client (e.g., client 101) in view of the authentication request.

Method 400 branches again in block 430 depending on whether a usage limit, for the ticket received in block 450, is met. For example, VPN server 103 may check whether the difference between a time the authentication ticket was produced and a current time meets a determined usage limit. In some embodiments, the usage limit indicates a limit on how long a ticket can be accepted after it is generated. If it is determined that the usage limit is met, method 400 may process to block 465. Otherwise, method 400 proceeds to block 470. In block 465, a prompt may be provided to the client to re-enter login credentials for the authentication server. In block 470, access to one or more service may be enabled in view of the authentication ticket.

Figure 5:
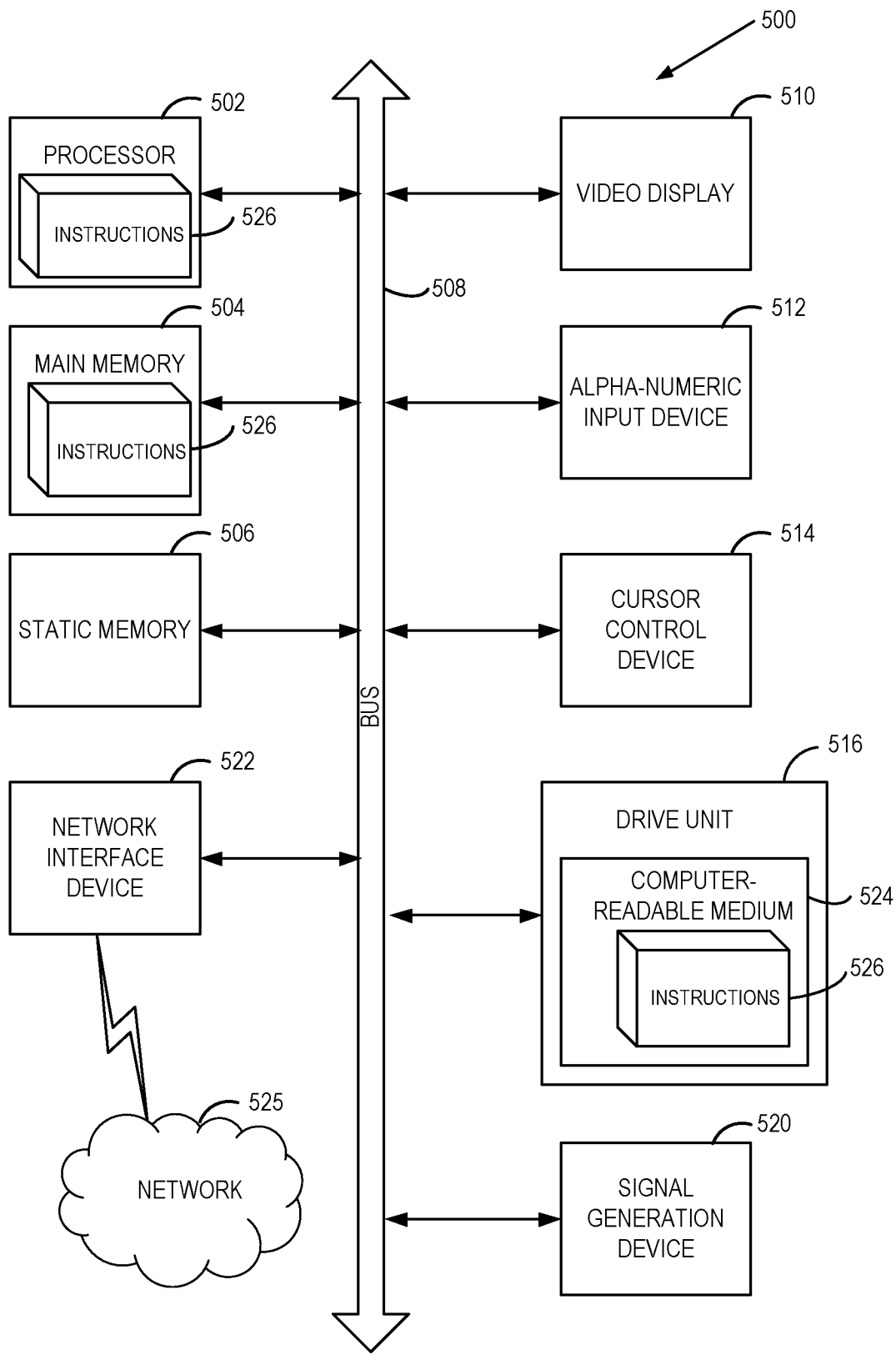
FIG. 5 depicts a block diagram of an example computer system operating in accordance with one or more aspects of the present disclosure.

FIG. 5 depicts an example computer system 500 which can perform any one or more of the methods described herein. In one example, computer system 500 may correspond to any one of the client (e.g., client 101) and server devices (e.g., authentication server 102 and server 103) of computer system 100 of FIG. 1. The computer system 500 may be connected (e.g., networked) to other computer systems in a LAN, an intranet, an extranet, or the Internet. The computer system 500 may operate in the capacity of a server in a client-server network environment. In some embodiments, the computer system 500 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a drive unit 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions that may include instructions to execute instructions 526 for performing the operations and steps discussed herein. For example, in one embodiment, the instructions 526 may perform any operations of flow diagram 200 of FIG. 2 and flow diagram 300 of FIG. 3.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The drive unit 516 or secondary memory may include a computer-readable medium 524 on which is stored one or more sets of instructions 526 (e.g., instructions for the instructions 526.) embodying any one or more of the methodologies or functions described herein. Instructions for the instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522. The instructions 526 may further be transmitted or received over a network 525 via the network interface device 522.

The non-transitory computer-readable storage medium 524 may also be used to store the instructions 526 persistently. While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, non-transitory computer-readable storage mediums, solid-state memories, optical media, and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in a combination hardware devices and software components. For example, the functionality of this module can exist in a fewer or greater number of modules than what is shown, with such modules residing at one or more computing devices that may be geographically dispersed. The modules may be operable in conjunction with network 525 from which it may receive and provide relevant information regarding geometries.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing", "transmitting", "receiving", "applying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   transmitting, by a Virtual Private Network (VPN) server, an authentication request to an authentication server, wherein the VPN server and the authentication server implement single sign-on authentication;
   receiving, by the VPN server, an authentication ticket responsive to the authentication request;
   providing, by the VPN server, the authentication ticket to a client that has initiated the authentication request;
   receiving, by the VPN server, from the client, a service request comprising the authentication ticket and a request to access a computing service residing on a protected network associated with the VPN server, wherein the service request does not include authentication server login information;
   responsive to successfully authenticating, by the VPN server, the client presenting the authentication ticket:
   determining that the client is authorized to access the computing service in view of the authentication ticket, and
   transmitting, to the computing service, a service access request comprising the authentication ticket; and
   responsive to detecting that a difference between a current time and a timestamp of the authentication ticket exceeds a threshold period of time, prompting the client to provide login credentials.

2. The method of claim 1, wherein transmitting the authentication request is performed over a secure communication link between the VPN server and the authentication server.

3. The method of claim 1, further comprising:
   responsive to detecting that a usage limit associated with the authentication ticket is met, providing a new prompt for client login credentials.

4. The method of claim 1, further comprising:
   identifying a network address associated with the client.

5. The method of claim 1, wherein the authentication ticket is encrypted using a secret key shared by the VPN server and the authentication server.

6. A system implementing a Virtual Private Network (VPN) server, the system comprising:
   a memory; and
   a processing device, operatively coupled to the memory, the processing device to:
   transmit, an authentication request to an authentication server, wherein the VPN server and the authentication server implement single sign-on authentication;
   receive an authentication ticket responsive to the authentication request;
   provide the authentication ticket to a client that has initiated the authentication request;
   receiving from the client, a service request comprising the authentication ticket and a request to access a computing service residing on a protected network associated with the VPN server, wherein the service request does not include authentication server login information;
   responsive to successfully authenticating, by the VPN server, the client presenting the authentication ticket:
   determine that the client is authorized to access the computing service in view of the authentication ticket, and
   transmit, to the computing service, a service access request comprising the authentication ticket; and
   responsive to detecting that a difference between a current time and a timestamp of the authentication ticket exceeds a threshold period of time, prompting the client to provide login credentials.

7. The system of claim 6, wherein transmitting the authentication request is performed over a secure communication link between the VPN server and the authentication server.

8. The system of claim 6, wherein the processing device is further to:
   responsive to detecting that a usage limit associated with the authentication ticket is met, provide a new prompt for client login credentials.

9. The system of claim 6, wherein the processing device is further to:
   identify a network address associated with the client.

10. The system of claim 6, wherein the authentication ticket is encrypted using a secret key shared by the VPN server and the authentication server.

11. A non-transitory computer-readable storage medium comprising executable instructions that, when executed by a processing device of a Virtual Private Network (VPN) server, cause the processing device to:
    transmit an authentication request to an authentication server, wherein the VPN server and the authentication server implement single sign-on authentication;
    receive an authentication ticket responsive to the authentication request;
    provide the authentication ticket to a client that has initiated the authentication request;
    receive, from the client, a service request comprising the authentication ticket and a request to access a computing service residing on a protected network associated with the VPN server, wherein the service request does not include authentication server login information;

responsive to successfully authenticating, by the VPN server, the client presenting the authentication ticket:

determine that the client is authorized to access the computing service in view of the authentication ticket, and transmit, to the computing service, a service access request comprising the authentication ticket; and responsive to detecting that a difference between a current time and a timestamp of the authentication ticket exceeds a threshold period of time, prompting the client to provide login credentials.

12. The non-transitory computer-readable storage medium of claim 11, further comprising executable instructions that, when executed by the processing device, cause the processing device to:

responsive to detecting that a usage limit associated with the authentication ticket is met, provide a new prompt for client login credentials.

13. The non-transitory computer-readable storage medium of claim 11, further comprising executable instructions that, when executed by the processing device, cause the processing device to:

identify a network address associated with the client.

14. The non-transitory computer-readable storage medium of claim 11, wherein the authentication ticket is encrypted using a secret key shared by the VPN server and the authentication server.

* * * * *